(12) United States Patent
Kolding et al.

(10) Patent No.: US 8,831,605 B2
(45) Date of Patent: Sep. 9, 2014

(54) CELL REGISTRATION

(75) Inventors: Troels Emil Kolding, Klarup (DK); Christian Markwart, München (DE); Johanna Katariina Pekonen, Espoo (FI); Hanns Juergen Schwarzbauer, Gröbenzell (DE); Ingo Viering, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 10 days.

(21) Appl. No.: 13/505,335

(22) PCT Filed: Nov. 2, 2009

(86) PCT No.: PCT/EP2009/064449
§ 371 (c)(1), (2), (4) Date: Jul. 18, 2012

(87) PCT Pub. No.: WO2011/050859
PCT Pub. Date: May 5, 2011

(65) Prior Publication Data
US 2012/0276899 A1    Nov. 1, 2012

(51) Int. Cl.
*H04W 4/00* (2009.01)
*H04M 3/00* (2006.01)
*H04W 24/02* (2009.01)
*H04W 84/04* (2009.01)

(52) U.S. Cl.
CPC ............ *H04W 24/02* (2013.01); *H04W 84/045* (2013.01)
USPC ........ 455/435.1; 455/418; 455/410; 455/444; 370/328; 370/338

(58) Field of Classification Search
USPC .................... 455/418, 444, 410; 370/254, 331
See application file for complete search history.

(56) References Cited

U.S. PATENT DOCUMENTS

| | | | |
|---|---|---|---|
| 7,477,920 B2 * | 1/2009 | Scheinert et al. | 455/561 |
| 8,140,104 B2 * | 3/2012 | Douglas et al. | 455/522 |
| 2008/0207170 A1 * | 8/2008 | Khetawat et al. | 455/411 |
| 2009/0094680 A1 * | 4/2009 | Gupta et al. | 726/3 |
| 2009/0129291 A1 * | 5/2009 | Gupta et al. | 370/254 |
| 2009/0247170 A1 * | 10/2009 | Balasubramanian et al. | 455/445 |

(Continued)

FOREIGN PATENT DOCUMENTS

WO    WO2009/118378 A1    10/2009

OTHER PUBLICATIONS

R3-080812, 3GPP TSG-RAN WG3, Apr. 2008.*

(Continued)

*Primary Examiner* — Jinsong Hu
*Assistant Examiner* — William Nealon
(74) *Attorney, Agent, or Firm* — Squire Patton Boggs (US) LLP

(57) ABSTRACT

A method for a mobile communications network where a cell is identifiable by a global identifier unique in the mobile communications network and/or a short identifier re-usable in another cell of the mobile communications network. A registry associates information representing a location within the coverage area of the mobile communications network to a defined group of short identifiers. When an access point sends a request for registration to provide services of a cell in a mobile communications network, the request includes information indicating a location of the access point. The registry is used to select a short identifier to be applied in a cell of an access point before registering the access point to provide services of a cell in the mobile communications network.

36 Claims, 3 Drawing Sheets

(56) References Cited

U.S. PATENT DOCUMENTS

2009/0298470 A1* 12/2009 Huber et al. .............. 455/411
2010/0027510 A1* 2/2010 Balasubramanian et al. 370/332
2010/0130210 A1* 5/2010 Tokgoz et al. ............. 455/437

OTHER PUBLICATIONS

Broadband Forum, Technical Report; "TR-069 CPE WAN Management Protocol V1.1", Version: Issue 1 Amendment 2, Version Date: Dec. 2007, pp. 1-138.

International Search Report and Written Opinion corresponding to International Application No. PCT/EP2009/064449 dated Jul. 8, 2010.

Nokia Siemens Networks et al, "Solution(s) to the 36.902's Automated Configuration of Physical Cell Identity Use Case," 3GPP Draft; R3-080812 (Phyid Autoconf), 3rd Generation Partnership Project (3GPP), vol. RAN WG3, Mar. 26, 2008, XP050164010, 7 pp.

Nokia Siemens Networks, "Automated Configuration of Physical Cell Identity," 3GPP Draft; R3-081280, 3rd Generation Partnership Project (3GPP), vol. Ran WG3, Apr. 30, 2008, XP050164456, 3 pp.

\* cited by examiner

FIG 5
| Time of PSC/PCI 53 | H(e)NB GCI 52 | PSC/PCI allocated 51 | PSC/PCI expiry 54 | Macro GCI area 50 |
|---|---|---|---|---|
| xx.xx.xx | Xxxxxxxxxxxx | Nnn | gg.gg.gg | {Macro-GCIx.PLx} |
| ... | | | | |
FIG 6
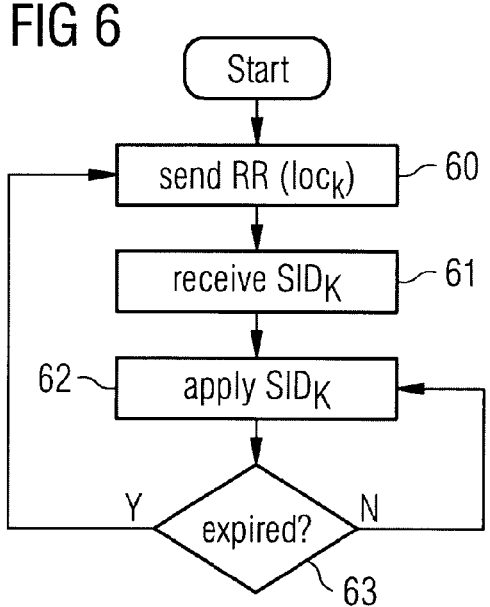
FIG 7
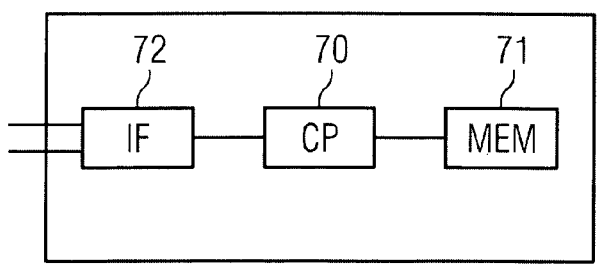

CELL REGISTRATION

FIELD OF THE INVENTION

The present invention relates to telecommunications and especially to management of cell identification.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

While operating in a network, cells apply at least one cell identifier, advantageously implemented as a block of code which identifies a cell within a defined area. Typically a cell has a global identifier that is unique in at least the domain of a mobile network operator of a mobile communications system. However, generally the global identifiers indeed identify cells globally. For example in 3GPP the Cell Global Identification is the concatenation of a Location Area Identification and a Cell Identity that is unique within a location area.

In addition to the global identifier, the cell may have one or more short identifiers that are used in defined network operations. Short identifier in this context refers to an identifier that is re-usable in another cell in the domain of a mobile network operator of a mobile communications system. Short identifiers are typically used to streamline the procedures and/or reduce signaling load associated to the network operations. For example, in 3GPP systems, when user equipment requests a handover to another cell in a wireless network, it provides to the serving cell measured values representing defined transmission characteristics of defined neighbouring cells. In the reporting the user equipment preferably applies only a short identifier of the cell. In 3GPP wideband code division multiple access (WCDMA) technology a short identifier used in measurement reports is a primary synchronisation (PSC) code. In 3GPP evolved UTRA (LTE) technology, a physical cell identifier (PCI) is applied in measurement reporting. In order to be easily measurable by the user equipment, PCI and PSC can only assume a limited set of values and need to be re-used across the network.

In a normal planned network where sectors and sites are controlled, and semi-static or static, it is easy for the operator to define the use of PCI/PSC values so that a defined user equipment measurement report that contains a short identifier (PSC/PCI) always points towards a defined base station that has a defined unique global cell identifier (GCI).

However, with increasing demand of broadband and wireless broadband traffic (e.g. multimedia, video) over internet, home and office users are fast be-coming important target customers for wireless operators and solution providers. A home base station is a device that can be installed to the user premises, for example to the user's home or office to the location he/she chooses, to serve as a femtocell access point. As home base stations are installed indoors they will allow service providers to extend service coverage indoors, especially where access would otherwise be limited or unavailable. Home base stations will also give some additional network capacity due to the small cell size and reduce the load from the macro cells. A key design requirement for femtocells is to provide seamless mobility towards, from, and even between femtocells.

However, the operator of the mobile communications system has basically very little control of the location of the femtocell access point, and the access points register to the network via an automatic registration procedure. With this lightly coordinated deployment of small scale cells the earlier assumptions can no longer be made and methods are needed to solve, or at least alleviate the ambiguity that potentially follows from use of short identifiers.

PCI/PSC collision refers to a situation, when there are cells that have at least partially overlapping coverage areas and use the same short identifier. In such situation user equipment may see two cells simultaneously using the same PCI/PSC value, which is not acceptable. PCI/PSC confusion means that there are more than one neighbouring cells that use the same short identifier, and the serving cell does not know which one user equipment is measuring and reporting. Hence, global ID measurements have to be requested and conducted to perform handovers.

As a start-up procedure, it is conventionally assumed that any home base station will scan its environment for used short identifiers and avoid collisions with the short identifiers detected in the scan. However, since the coverage of a home base station is very small, one home base station will typically not see any other home base stations and is therefore able to avoid collisions only with the macro layer short identifiers that are in use. A macro cell, on the other hand, can have hundreds of home base stations inside its coverage. In the absence of unique mapping between short identifiers used in measurement reports and the global identifiers of the home base stations, a macro cell is likely to receive conflicting reports. This may seriously disrupt the handover procedures, especially in areas of dense cell population.

In addition, some network procedures are implemented differently, depending on whether the home base station is of a type "open", "hybrid" or "CSG" (closed subscriber group). In order to operate these procedures reliably with the short identifiers, some conditions must be met:

The macro cell needs to be able to assume that there is no risk of short identifier confusion. There must be only one neighbour cell using a defined short identifier.

The macro cell needs to be able to store and use the information about the home base station when once reported by a user equipment.

The macro cell needs to know whether a user equipment is allowed to access a particular CSG cell in order to trigger the relocation/handover request only to allowed CSG cells. The current agreement in designs is based on the assumption that the source radio access network can rely on a user equipment indication, whether the CSG neighbour cell is allowed for the user equipment or not. Hence, the user equipment will still be required to measure CSG identifier to check that the admission is clear, but this measurement does not need to be transmitted over the network if there is no confusion or collisions in the cell.

In general, the better the risk of collisions and confusions is known and managed, the better is the possibility that measurements can be implemented quickly and conveniently from the user equipment performance point of view. Additionally, measurements do not necessarily need to be requested or transmitted over the network towards a central node that presently conducts the handover.

SUMMARY

An object of the present invention is to provide a more effective management of femtocell access point identification.

An aspect of the invention is a method that comprises operating a mobile communications network where a cell is identifiable by a global identifier unique in the mobile communications network and/or a short identifier re-usable in another cell of the mobile communications network; maintaining a registry associating information representing a location within the coverage area of the mobile communications network to a defined group of short identifiers; sending from the access point a request for registration to provide services of a cell in a mobile communications network, the request including information indicating a location of the access point; and using the registry to select a short identifier to be applied in a cell of an access point before registering the access point to provide services of a cell in the mobile communications network.

According to a further aspect of the invention the method comprises storing in a management unit the registry and an algorithm configured to evaluate applicability of a short identifier in that location based on information in the registry; and using the registry and the algorithm to determine a short identifier to be applied in the cell of the access point.

According to a further aspect of the invention the access point requests registration to provide services of a femtocell.

According to a further aspect of the invention the information representing a location within the coverage area of the mobile communications network comprises a global identifier of at least one macro cell identified as assessable by the access point.

According to a further aspect of the invention the method comprises storing in the registry a record comprising the global identifier of one of the at least one macro cell identified as assessable by the access point, the global identifier of the cell of the access point, and the short identifier taken into use in the cell of the access point.

According to a further aspect of the invention the method comprises storing in the registry for each of the macro cells identified as assessable a record comprising at least one of the global identifier of the macro cell, the global identifier of the cell of the access point, and the short identifier taken into use in the cell of the access point.

According to a further aspect of the invention the method comprises storing also temporal information indicating a period during which the short identifier is valid for use in the access point.

According to a further aspect of the invention the method comprises assessing macro cells in the access point; and selecting macro cells to be identified as assessable by the access point according to a predefined selection procedure.

According to a further aspect of the invention the selection procedure comprises selecting macro cells, the path loss values of which exceed a predefined threshold value, selecting a predefined number of macro cells in the order of their path loss values, or selecting macro cells the deviation of a path loss value from a largest path loss value of which is within a predefined limit.

According to a further aspect of the invention the method comprises including in the request also a proposed short identifier to be applied in the cell of the access point.

According to a further aspect of the invention the method comprises determining a group of short identifiers in use in cells assessable by the access point; and using a short identifier that is not in the determined group as a proposed short identifier to be applied in the cell of the access point.

According to a further aspect of the invention the method comprises estimating a probability of a conflict or collision between an unused short identifier and the group of short identifiers associated to the location of the access point. MS According to a further aspect of the invention the method comprises determining a probability for conflict or collision between the proposed short identifier to be applied in the cell of the access point and the group of short identifiers associated to the location of the access point; and determining whether to accept or reject the proposed short identifier to be applied in the cell of the access point according to the determined probability exceeding a predefined threshold.

According to a further aspect of the invention the method comprises assigning, in response to rejecting the proposed short identifier, a new short identifier to be applied in the cell of the access point.

According to a further aspect of the invention the method comprises determining a value representing a probability of conflict between the determined short identifier and a macro cell; and delivering the value to the macro cell.

Another aspect of the invention is an apparatus that comprises means for providing cellular access in a mobile communications network where a cell is identifiable by a global identifier unique in the mobile communications network and/or a short identifier re-usable in another cell of the mobile communications network; means for sending to a defined management system a request for registration to provide services of a cell in the mobile communications network, the request including information indicating location of the apparatus; means for receiving an assigned short identifier to be applied in services of the cell; and means for taking the determined short identifier into use in the apparatus.

According to a further aspect of the invention the request requests registration to provide services of a femtocell.

According to a further aspect of the invention the information represents a location within the coverage area of the mobile communications network comprising a global identifier of at least one macro cell identified as assessable by the access point.

According to a further aspect of the invention the apparatus comprises means for assessing surrounding macro cells; and means for selecting macro cells to be identified as assessable according to a predefined selection procedure.

According to a further aspect of the invention the selection procedure comprises selecting macro cells the path loss values of which exceed a predefined threshold value, selecting a predefined number of macro cells in the order of their path loss values, or selecting macro cells the deviation of a path loss value from a largest path loss value of which is within a predefined limit.

According to a further aspect of the invention the apparatus comprises means for including in the request also a proposed short identifier to be applied in the cell of the access point.

A further aspect of the invention is an apparatus that comprises means for managing entry of access point cells to a mobile communications network where a cell is identifiable by a global identifier unique in the mobile communications network and/or a short identifier re-usable in another cell of the mobile communications network; means for maintaining a registry associating information representing a location within the coverage area of the mobile communications network to a defined group of short identifiers; means for storing an algorithm configured to evaluate applicability of a short identifier in that location based on information in the registry; means for receiving from an access point a request for registration to provide services of a cell in a mobile communications network, the request including information indicating a location of the access point; means for using the algorithm to determine a short identifier to be applied in the cell of the access point; and means for sending the determined short identifier to the access point.

According to a further aspect of the invention the information represents a location within the coverage area of the mobile communications network comprising a global identifier of at least one macro cell identified as assessable by the access point.

According to a further aspect of the invention the apparatus comprises means for storing in the registry a record comprising the global identifier of one of the at least one macro cell identified as assessable by the access point, the global identifier of the cell of the access point, and the short identifier taken into use in the cell of the access point.

According to a further aspect of the invention the apparatus comprises means for storing in the registry for each of the macro cells identified as assessable a record comprising at least one of the global identifier of the macro cell, the global identifier of the cell of the access point, and the short identifier taken into use in the cell of the access point.

According to a further aspect of the invention the apparatus comprises means for storing also temporal information indicating a period during which the short identifier is valid for use in the access point.

According to a further aspect of the invention the request includes also a proposed short identifier to be applied in the cell of the access point.

According to a further aspect of the invention the apparatus comprises means for determining a group of short identifiers in use in cells assessable by the access point; and means for selecting for use a short identifier that is not in the determined group as a proposed short identifier to be applied in the cell of the access point.

According to a further aspect of the invention the apparatus comprises means for estimating a probability of conflict or collision between an unused short identifier and the group of short identifiers associated to the location of the access point.

According to a further aspect of the invention the apparatus comprises means for determining a probability for a conflict or collision between the proposed short identifier to be applied in the cell of the access point and the group of short identifiers associated to the location of the access point; and means for determining whether to accept or reject the proposed short identifier to be applied in the cell of the access point according to the determined probability exceeding a predefined threshold.

According to a further aspect of the invention the apparatus comprises means for assigning, in response to rejecting the proposed short identifier, a new short identifier to be applied in the cell of the access point.

According to a further aspect of the invention the apparatus comprises means for determining a value representing a probability of conflict between the determined short identifier and a macro cell; and means for delivering the value to the macro cell.

A further aspect of the invention is a mobile communications network comprising any of the described apparatuses that comprises means for providing cellular access in a mobile communications network.

According to a further aspect of the invention the network comprises a macro cell; the management system is configured to determine a value representing a probability of conflict between the determined short identifier and a macro cell and deliver the value to the macro cell; and the macro cell is configured to determine whether to initiate a defined procedure for decreasing the probability of conflict or collision.

According to a further aspect of the invention the defined procedure comprises the macro cell requesting user equipment to include global identifier of a measured cell in cell measurement reports.

A further aspect of the invention is a computer program product comprising program code means adapted to perform comprising program code adapted to perform any of the method aspects disclosed above when the program is run on a computer.

A further aspect of the invention is a computer program product comprising program code means adapted to perform a procedure when the program is run on a computer apparatus, the procedure comprising: providing cellular access in a mobile communications network where a cell is identifiable by a global identifier unique in the mobile communications network and/or a short identifier re-usable in another cell of the mobile communications network; sending to a defined management system a request for registration to provide services of a cell in the mobile communications network, the request including information indicating location of the apparatus; receiving an assigned short identifier to be applied in services of the cell; and taking the determined short identifier into use in the apparatus.

A further aspect of the invention is a computer program product comprising program code means adapted to perform a procedure when the program is run on a computer apparatus, the procedure comprising: managing entry of access point cells to a mobile communications network where a cell is identifiable by a global identifier unique in the mobile communications network and/or a short identifier re-usable in another cell of the mobile communications network; maintaining a registry associating information representing a location within the coverage area of the mobile communications network to a defined group of short identifiers; storing an algorithm configured to evaluate applicability of a short identifier in that location based on information in the registry; receiving from an access point a request for registration to provide services of a cell in a mobile communications network, the request including information indicating a location of the access point; using the algorithm to determine a short identifier to be applied in the cell of the access point; and sending the determined short identifier to the access point.

BRIEF DESCRIPTION OF THE DRAWINGS

In the following, embodiments will be described in greater detail with reference to accompanying drawings, in which

FIG. 5 illustrates an exemplary data structure for records in a registry;

FIG. 6 illustrates steps of a procedure in an embodiment of another method according to the present invention;

FIG. 7 shows a block diagram illustrating an exemplary apparatus architecture.

DETAILED DESCRIPTION OF SOME EMBODIMENTS

Figure 1:
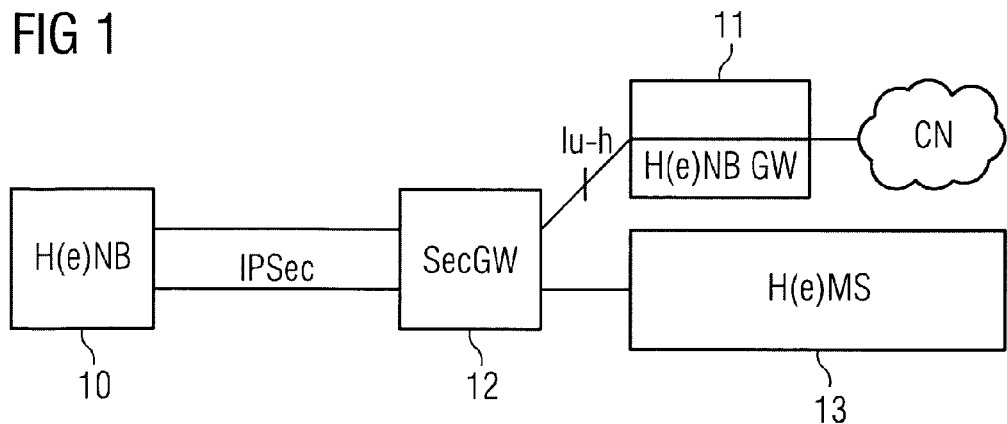
FIG. 1 illustrates the general architecture of a mobile communications system incorporating a 3GPP Femto system.

The following embodiments are exemplary. Although the specification may refer to "an", "one", or "some" embodiment(s) in several locations, this does not necessarily mean that each such reference is to the same embodiment(s), or that the feature only applies to a single embodiment.

Single features of different embodiments may also be combined to provide other embodiments.

In the following, different embodiments will be described using one example of system architecture without, however, restricting the invention to the disclosed terms and structures. The invention is applicable to any cellular communication network in which an access point can independently request to be registered as a provider of services of a cell.

More specifically, the invention is illustrated here in a 3GPP Femto system, but the invention is not limited to 3GPP configurations or femtocells, but applies to any kind and size of cells that may independently register to the network. Femto related topics are presently under active design and discussions in various standardization organizations, for example the Femto Forum, Broadband Forum, 3GPP, and WiMAX Forum, among others. The features of the present invention can naturally be applied in any Femto related technologies, such as WiMAX Femto systems, LTE Femto systems, Femto/Self Organising Networks (SON), among others, as a general solution to optimally control the use of cell identifiers within the network. Protocols, specifications of communication systems and their elements, especially in wireless communication, develop rapidly. Such development may require some further changes to further embodiments.

Therefore, all words and expressions should be interpreted broadly and they are intended to illustrate, not to restrict, the embodiment.

An access point refers here to a network node that is connected to a network and also provides a radio interface via which terminals can connect with the access point and through to the network. In the following, concepts around a femto access point (FAP), or a "femtocell" are discussed in more detail. A femtocell refers here to any femto-related access point, such as a Fixed Access Point, Home Base station, Home Node B, etc. Typically, femto access point provides a small-scale cellular base station designed specifically for indoor coverage. It connects to a service provider's network via broadband (for example DSL or cable), and provides a standard-based radio interface using a licensed spectrum to communicate with mobile terminals. The 3rd Generation Partnership Project (3GPP) is presently preparing standards for the 3G Femto. 3GPP standards introduce some new network elements, such as the Home NodeB (HNB) or Home eNodeB (HENB), and the Home NodeB Gateway (HNB-GW) or the Home eNodeB Gateway (HeNB-GW). Also logical elements Security Gateway (SecGW) and HNB Management System (HMS) or HeNB Management System (HeMS) are specified. Access to 3G and evolved 3G (EPS) services may be provided via UTRAN or E-UTRAN home base stations. In case of UTRAN, names HNB, HNB-GW, and HMS are typically used, whereas in case of E-UTRAN, names HeNB, HeNB-GW, and HeMS are typically used. For simplicity of the description, in the following these network elements of the two access types are jointly referred to as H(e)NB, H(e)NB-GW, and H(e)MS.

FIG. 1 illustrates the general architecture of a mobile communications system incorporating a 3GPP Femto system. H(e)NB 10 is a device that can be installed to the user premises, for example to the user's home or office to the location he/she chooses, to serve as a femtocell access point. The operator of the mobile communications system has basically no direct control of the location of the femtocell access point. The H(e)NB may be powered from electric outlets in the user premises, and the existing broadband internet connections (such as DSL, Ethernet or cable) available in the premises may be used for backhaul connections to the service provider's network. The H(e)NB may be able to operate with several, e.g. 4 to 8, existing 3G user equipments and may offer them the same services as if they were operating under a regular NodeB. One H(e)NB typically serves only one cell. H(e)NB-GW 11 is a device that may be used to connect H(e)NBs to a 3G network. H(e)NB-GW 11 serves the purpose of a radio network controller presenting itself to the core network as a concentrator of H(e)NB connections. An Iu interface between the core network and H(e)NB-GW 11 serves the same purpose as the interface between the core network and a radio network controller. H(e)NB-GW 11 can be located anywhere at the operators premises.

SecGW 12 is a logical element which can be physically implemented separately or be integrated within the H(e)NB-GW. SecGW 12 may terminate secure tunnelling (e.g. IPSec) for Auto-Configuration Server and Iu-h/S1 protocols and may act as a firewall between the operator's core network elements and the public internet. SecGW 12 represents operator's core network in performing a mutual authentication with H(e)NB to provide it with access to H(e)MS and H(e)NB-GW.

The interface specified between the H(e)NB and H(e)NB-GW is Iu-h/S1. This interface may be tunnelled over the residential internet connection of the customer and over the public internet. In other words, a backhaul link used between H(e)NB 10 and SecGW 12 provides a secure tunnel carrying both the user plane data and the control plane data that are transmitted between the H(e)NB and network elements in the core network. In case of H(e)NB to H(e)NB-GW, the interface provides transport for the control and user plane messages. A radio access network application part (RANAP) user adaptation (RUA) is used over Iu-h to provide transparent transfer for the RANAP messages. A control plane Home NodeB Application Protocol (HNBAP) may be used to carry the H(e)NB-specific control information between H(e)NB and H(e)NB-GW entities. Transparent transport is also provided for the Iu user plane protocol layer, which is terminated at the core network, not at the H(e)NB-GW. All this may be carried over an encrypted IPSec tunnel.

H(e)MS 13 allows the configuration data to be sent to the H(e)NB and also facilitates the H(e)NB in H(e)NB-GW and SecGW discovery. H(e)MS may also initiate H(e)NB software updates and perform H(e)NB location verification. H(e)MS 13 is primarily designed to use an interface based on the TR-069 standards widely used in DSL modem and DVB set-top-box management and updates. TR-069 will likely be reused for 3G Femto and LTE Femto. Furthermore, TR-069 is also applicable to WiMAX Femto and may be used by further Femto technologies as well.

The femto architecture and its elements differ from the standard UTRAN and E-UTRAN configurations, and their functionalities are somewhat differently arranged, as well. The functions usually handled by the NodeB are divided between the H(e)NB and H(e)NB-GW. Because the H(e)NB itself is the part which actually contains the radio and is located near the user, it has the main responsibility for radio resource and B subscriber restricted access (RAB) management tasks. The H(e)NB is in charge of the admission control and together with the core network it manages the RAB establishments, modifications and releases. Security functions on the air interface, like ciphering, are also managed by the H(e)NB with the core network managing the key.

Figure 2:
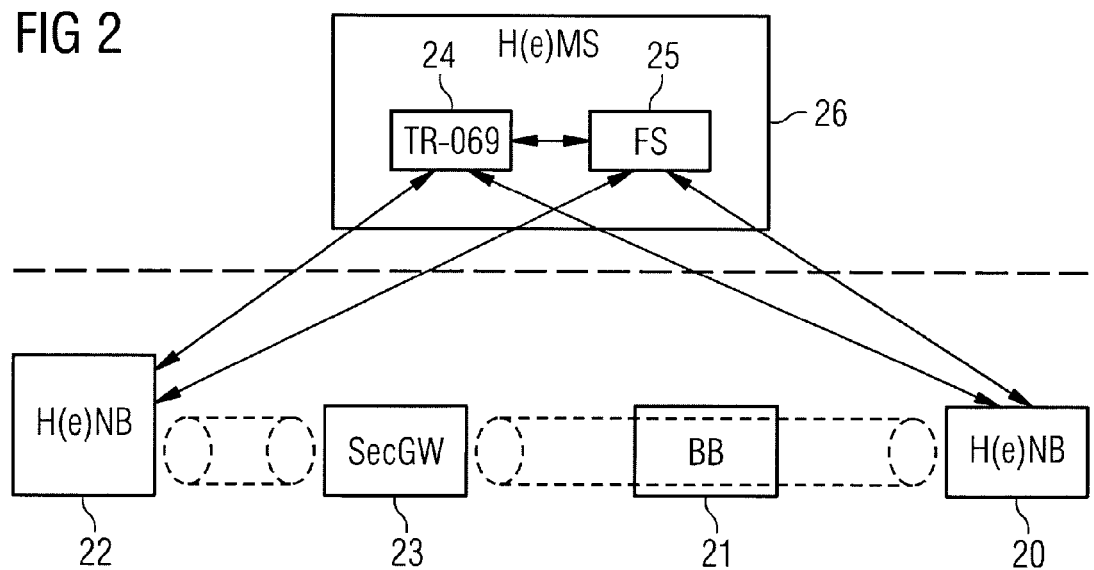
FIG. 2 illustrates in more detail the architecture for a conventional management system.

FIG. 2 illustrates in more detail the architecture for a conventional H(e)NB management system that manages entry of access point cells to the network. H(e)NB architecture allows to operate H(e)MS inside the operator's core network (i.e. TR-069 type connection using the IPSec tunnel between SecGW and H(e)NB) or outside the operator's core network (i.e. TR-069 type connection between H(e)NB and H(e)MS using the Internet). Several types of interfaces have already been specified between H(e)NB and H(e)MS. FIG. 2 illustrates H(e)MS and the H(e)NB management over Type 1 interface between H(e)NB and H(e)MS, and the exemplary embodiments of the invention will be described in this context. H(e)NB GW is not, as such, relevant in operations of the present invention.

FIG. 2 shows two exemplary configuration variations for the H(e)NB, one where H(e)NB 20 is connected to a separate broadband device 21, and one of a broadband device 22 with an integrated H(e)NB functionality. Both nodes 20, 22 connect with the Security Gateway SecGW 23 via IPSec tunnelling. H(e)MS 26 of FIG. 2 comprises a TR-069 manager 24 and a file server 25. The TR069 manager 24 implements the Auto-Configuration Server function as defined in Broadband Forum Technical Report TR-069: "CPE WAN Management Protocol v1.1". The file server 25 may be used for file upload or download, as instructed by TR-069 manager. However, the file server 25 may also be used by other applications in the mobile network operator domain.

An embodiment of the present invention relates to an apparatus operable as a cell management system in a cell-based mobile communications system where access nodes may independently request registration to provide services of a cell. The present embodiment applies the typical configuration where each network operator manages a cell management system controlling H(e)NBs in their own domain. Therefore, in the following the terms 'mobile communications system' and 'mobile communications network' may be interpreted as system and network entities specific for a particular network operator domain. However, it is clear that the invention as such is not limited to operator-specific elements and operations, but is applicable in various communications systems and networks with various separate and combined system and/or subsystem configurations.

Figure 3:
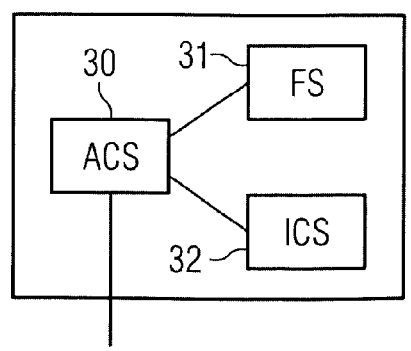
FIG. 3 illustrates architecture of a management system enhanced with means to control use of short identifiers.

As an example of an apparatus operable as a cell management system, FIG. 3 illustrates a H(e)NB management system H(e)MS enhanced with means to control use of short identifiers in the H(e)NB. As the conventional system, H(e)MS of FIG. 3 comprises an auto-configuration system (e.g. TR-069 manager) 30 and a file server 31. In addition, H(e)MS comprises an identifier control system (ICS) 32 that provides identifier control procedures to be described in the following. In FIG. 3 ICS 32 is described as a separate entity that operates under the control of the auto-configuration system 30. It is clear that this configuration is only one example from a plurality of implementation alternatives. The identifier control system 32 is a logical element that may be integrated to the auto-configuration system 30, the file server 31, or some other element within H(e)MS. On the other hand, functions of the identifier control system 32 may be divided between the auto-configuration system 30, the file server 31, or some other element within H(e)MS. The identifier control system 32 may also be implemented as a separate network node, or its functions may be divided between at least two network nodes. Further configurations are easily conceivable to a person skilled in the art.

In order to solve or at least alleviate the ambiguity that potentially follows from use of short identifiers with uncoordinated deployment of H(e)NBs, the identifier control system (ICS) 32 is configured to maintain a registry that associates information, which represents a location within the coverage area of the mobile communications network to a defined group of short identifiers. ICS maintains this registry by collecting and storing in it history information on short identifiers applied in the network.

ICS also stores an algorithm configured to evaluate applicability of a short identifier in a defined location based on information in the registry. When ICS receives from an access point a request for registration to provide services of a cell in a mobile communications system, it checks the location of the requesting access point and then uses the registry to check the applicability of one or more available short identifiers in that location, and selects an appropriate short identifier for the requesting cell. This procedure adds a level of control that significantly eliminates conflicts and collisions in network operations that use short identifiers, but does not significantly increase the complexity of the network operations, nor incur considerable additional load to the network.

Figure 4:
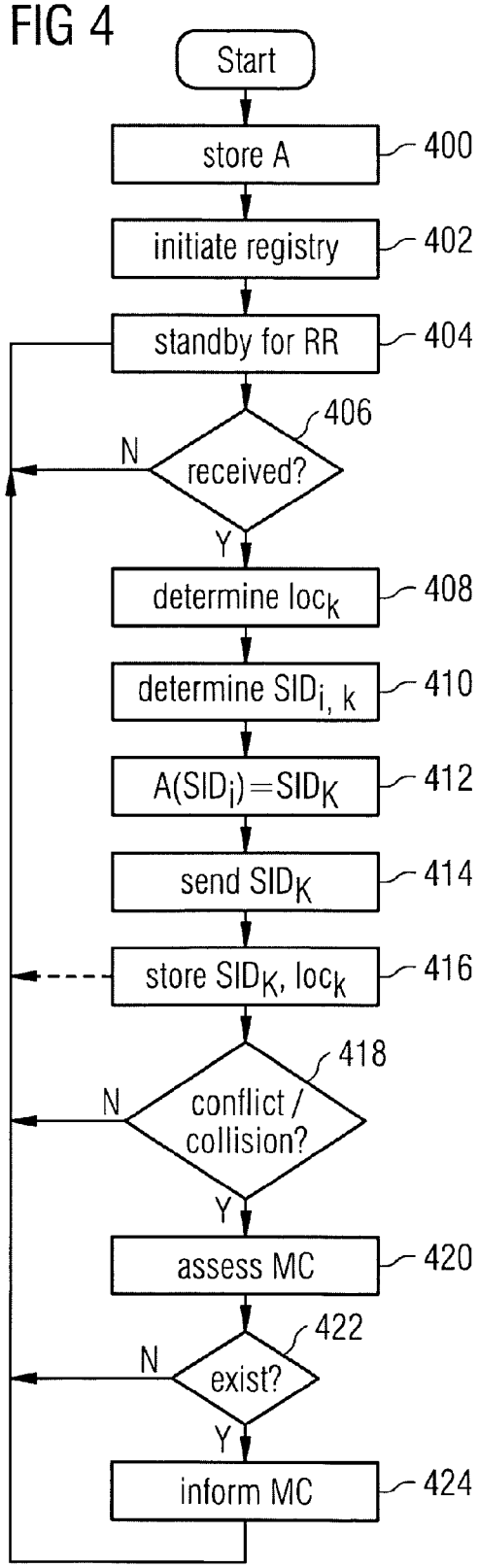
FIG. 4 illustrates steps of a procedure in an embodiment of a method according to the present invention.

Features of the identifier control system are described in more detail with the flow chart of FIG. 4. FIG. 4 illustrates steps of a procedure that is an example for an embodiment of a method according to the present invention. The exemplary procedure of FIG. 4 is shown as implemented in H(e)MS apparatus of FIG. 3 and is applicable in the 3GPP mobile communications system of FIG. 1, so any relevant parts of their description may be combined with the description of FIG. 4.

The procedure begins in the stage where H(e)MS is switched on and commissioned to operate in the network. H(e)MS is initiated by storing (step 400) to it an algorithm A for evaluating applicability of a short identifier in a defined location. Characteristics of the algorithm A will be discussed in more detail with step 412.

H(e)MS is also configured with a registry (step 402), to the records of which information on the use of short identifiers in various locations will accumulate during operation of H(e)MS. At minimum a record of the registry comprises a field for information defining a location, and a field for short identifier applied in the location. However, for streamlined and optimized operations, some additional fields may be applied.

FIG. 5 illustrates an exemplary data structure for the records in the H(e)MS registry. In the example, the information that represents a location within the coverage area of the mobile communications network typically comprises a global identifier of at least one macro cell identified as assessable by the access point. When an access point is activated, it begins to monitor and measure transmissions of other cells around it. Depending on the network configuration and surrounding environment, an access point may be able to receive transmissions from several cells, typically in various transmission levels. An access point normally detects a relatively strong transmission level from at least one macro cell. A macro cell refers to a relatively large-sized cell which may have a diameter of several kilometers. Macro cells are used both in the countryside as well as in urban areas. In the cities, their antennas are typically placed above the average construction height, for example on the roofs of buildings. Macro cells may be considered to provide an overlay, under which various types of underlay cell structures may operate.

As discussed earlier, a location of a macro cell is substantially static, the macro cell is practically not moved from one place to another. Or if such transfer is made, it may be generally assumed that potential associated adjustments needed to other elements are managed by the operator, so the network operations, as such can rely on stored location information of the macro cells. Therefore, an access point may indicate its location to H(e)MS by telling which macro cell(s) it is able to assess around it. The macro cell identifiers directly map to defined locations in the network coverage. As shown in FIG. 5, the exemplary record thus comprises a field 50 for recording a macro cell area, for example, in terms of a macro cell global identifier. Assessing refers to actions for systematically examining the extent to which an entity is capable of fulfilling specified requirements, and in this example the specified requirements relate to a handover between a macro cell and a femtocell. It is noted that other requirements relating to other network operations may be applied without deviating from the scope of protection. In the present example, in order for a cell to become assessable, transmissions of an assessable cell must be strong enough such that the assessing cell is able to perform any necessary examination for its evaluations. In this example, at minimum one macro cell needs to be assessable by the access point, otherwise a short identifier may not be assigned to it. If some other type of location indication is applied, this possibility to assess at least one macro cell is not necessarily required. For example, in the embodied exemplary system configuration it is important to get information on the macro coverage zone in which the future H(e)NB will operate. One needs to know what is the serving macro cell that will initiate handovers towards H(e)NB cell in question.

It is noted that depending on the location of H(e)NB, multiple macro cells may handover user equipment to it. Thus, reporting the strongest macro cell may actually be insufficient. An access point may also be configured to assess as many macro cells around it as possible and select macro cells to be identified as assessable according to a predefined selection procedure. The selection may be done in many ways. For example, the selection procedure may comprise:

selecting macro cells the path loss values of which exceed a predefined threshold value, selecting a predefined number of (strongest) macro cells in the order of their path loss values, or selecting macro cells such that the deviation between the path loss value of a selected macro cell and the largest path loss value of the macro cells is within a predefined (dB) limit.

Other selection procedures may be applied without deviating from the scope of protection. The selection procedure may be coded integrally into the request procedure of H(e)NB or be configurable, for example, via a parameter received during initial H(e)NB device configuration.

In order to provide the mapping between a location and a short identifier used around that location, the exemplary record also comprises a field 51 for information on a short identifier assigned to an access point that has identified the macro cell of field 50 to be assessable. Advantageously, the record comprises also a field 52 for the global identifier of the femtocell to be provided by the access point. This facilitates recording history of short identifier assignments to a defined femtocell. This history may also be applied by the algorithm, as will be discussed later.

In order to reduce signalling associated to the short identifier management, the record may also comprise a field for temporal information indicating a period during which the short identifier is valid for use in the access point. In the example of FIG. 5, the record comprises actually two temporal information fields. Field 53 indicates the time the short identifier was assigned to the access point and field 54 indicates the time the assigned short identifier is intended to expire.

H(e)NB needs to request registration at initiation and at defined operative stages thereafter. One of such operative stages is restart that is necessary when, for example, the H(e)NB user powers off H(e)NB, there are aggressive power saving schemes implemented, if fixed network operator renews the IP address of the H(e)NB to avoid servers residing on dynamic IP addresses, or the IPsec tunnel carrying the Iuh/S1 interface needs to be re-established due to failure situations in the IP network. In practice, H(e)NB may need to be restarted relatively frequently, perhaps even on a daily basis. Hence, it may be too heavy process if the H(e)MS short identifier control procedure has to take place at every restart. Repetition of the control procedure at each restart may be avoided by defining for the assignment a period during which it is valid. During the validity period H(e)NB can use the assigned short identifier freely, and the short identifier is not released even if the H(e)NB has been switched off.

Further, use of validity period is advantageous also for managing the amount of available short identifiers. Since H(e)NB that is shut down can not report its off state to H(e)MS, the expiry time for the short identifier validity can be used to trigger H(e)MS to release the short identifier for use by some other access point.

The validity period may be defined and monitored by means of a clock or an expiry timer. Static and/or ubiquitous validity periods may be applied, but the length of the validity period may be used to further control the availability of the short identifiers. If there are adequately available short identifiers for the number of access points, the validity periods can be long and vice versa.

Returning back to FIG. 4, after the initiation steps 400, 402 H(e)MS becomes standby (step 404) for registration requests from H(e)NBs. A registration request comprises at least information indicating location and identifier of the requesting access point. When a registration request arrives to H(e)MS (step 406), it determines the location $loc_k$ (step 408) of the access point from which the request is received. The location may be indicated in various ways, for example as a direct global positioning system coordinate. However, the information that represents a location may comprise a global identifier of at least one macro cell identified as assessable by the access point, as described above.

H(e)MS also determines (step 410) a group of short identifiers $SID_{i,k}$ available for assignment to the requesting H(e)NB. Then it is able to use the algorithm A to determine from the group of available short identifiers $SID_{i,k}$ a short identifier $SID_K$ for assignment to the requesting H(e)NB.

Algorithm A may be configured to select the short identifier $SID_K$ independently from the group of available short identifiers $SID_{i,k}$. On the other hand, in order to streamline the procedure, H(e)NB may include in its request short identifier it proposes to be applied in the cell, also referred to as femtocell it provides. H(e)NB may, for example, scan its environment and select from short identifier values in a range of available short identifier values one value $SID_k$ it has not been able to extract from messages exchanged or broadcast in its surrounding environment. However, as noted earlier, H(e)NB may often make a bad decision because it only senses very few of the other H(e)NBs.

Accordingly, before letting the access point to operation as a femtocell, H(e)MS uses the algorithm A first to determine the applicability of the short identifier $SID_k$ proposed by H(e)NB. If the proposed short identifier is applicable, H(e)MS sends to H(e)NB a confirmation on assignment of the proposed short identifier ($SID_k \rightarrow SID_K$). If the proposed short identifier is not applicable, H(e)MS chooses one $SID_K$ of the other available short identifiers and sends (step 414) to H(e)NB a message indicating assignment of that identifier.

The algorithm A is configured to use the information that represents the location $loc_k$ of the requesting access point to determine a group of short identifiers associated to the location, and the estimate a probability of a conflict or collision between a candidate short identifier and the determined group of short identifiers. A collision between identifiers means that one and same identifier is applied by two parties. In some systems collisions cannot be totally avoided, but already the possibility to avoid them as far as possible is a remarkable improvement. In the following, an algorithm for reducing the number of collisions is shown. It is noted that the algorithm is a simplified example for illustrating the present embodiment. Other forms of conflicts and/or collisions between the cell identifiers are possible, and they can be eliminated or alleviated similarly by corresponding further adjustments to the algorithm.

Accordingly, when the request carrying at least one global identifier of macro cells identified by H(e)NB as assessable arrives to H(e)MS, it retrieves from the registry all records where a short identifier is associated to any of these macro cell global identifiers. Estimation of the probability of a conflict in this case is relatively straightforward: a candidate short identifier is compared with short identifiers retrieved from the registry and if none of the comparisons show a match, probability that the candidate short identifier collides is 0. On the other hand, if any of the comparisons show a match, probability that the candidate short identifier collides is 1. The determined probability may then be used to decide whether to accept or reject a candidate short identifier. In our exemplary case, a first candidate short identifier with zero probability may be selected to be assigned to the access point.

In order to maintain the registry, H(e)MS further stores (step 416) a record comprising at least the assigned short identifier $SID_K$ and information representing the location where the assigned short identifier is to be taken into use. In the present example, a record comprising the fields 50-54 of FIG. 5 is stored. After this H(e)MS may return to step 404 to be standby for further registration requests.

However, as discussed earlier, it is possible that confusions, and even collisions cannot be completely avoided. For example, if all candidate short identifiers collide with some short identifier in the determined group of short identifiers, and there are no more unused short identifiers available, then a conflicting short identifier must be assigned. In such a case the algorithm may be further configured to select a short identifier that would only lead to conflict towards the macro cell in locations where the path loss is the highest, e.g. where probability of actual conflict to happen is lowest. The selection can be by means of 2D optimization so that conflicts between two H(e)NBs towards one macro cell are arranged such that in terms of path loss one of the conflicting H(e)NBs is closest to the macro cell and the other is as far away as possible.

The embodiments of the invention in this way allow assessing and alleviating problems from conflicts. In addition it is possible to further improve the situation by delivering to the macro cell information on assessed conflict. The macro cell can then determine whether to initiate a defined procedure for decreasing the probability of conflict during its operations. For example, in the example of FIG. 4 H(e)MS can assess (step 420) whether a conflict or collision of some level exists between a short identifier applied by a macro cell MC and an short identifier $SID_K$ assigned to H(e)NB. If (step 422) this is the case, H(e)MS further informs (step 424) the macro cell whether it operates in collision-free environment or not. In the example of FIG. 4, H(e)MS only warns macro cells which do not operate in collision-free environment. It is clear that H(e)MS can be alternatively configured to determine at every assignment a value that represents a probability of conflict between the assigned short identifier and a macro cell and deliver the value to the macro cells identified as assessable. The macro cell can then determine whether to initiate a defined procedure for decreasing the probability of conflict or collision. An example of such procedures comprises the macro cell requesting its user equipment to include global identifier of a measured cell in cell measurement reports. The initiation of the defined procedure may even be made for specific short identifier which means that the laborious confusion/collision-handling operations can be focused to cases where they are strictly needed. The arrangement allows a significant reduction to the number of user equipment measurements as well as network signaling, even if some collisions/confusion would unavoidably remain.

Implementation of the embodiment of FIGS. 3 and 4 requires some modifications to the operations of H(e)NB, as well. These modifications are described in more detail with the flow chart of FIG. 6. FIG. 6 illustrates steps of a procedure that is an example for an embodiment of a method according to the present invention. The exemplary procedure of FIG. 6 is shown as implemented in an access point apparatus that requests becoming a H(e)NB of FIG. 1, and operates interactively with the H(e)MS of FIGS. 3 and 4. For conciseness, many parts of H(e)NB description overlapping with the H(e)MS description are not repeated here. Any further details may be referred from the description of any of FIGS. 1, 3, and 4.

The procedure begins in the stage where the access point is switched on. Instead of selecting a short identifier merely on the basis of assessing the surrounding cells, the access point sends (step 60) to H(e)MS a request RR to be registered as a provider of services of a cell in the mobile communications system. The request includes at least information indicating location $loc_k$ of the access point apparatus. Advantageously some additional information for the purpose of maintaining the registry is included in the request. In the present example example, a request sent to the management system may contain the following components.

A list of macro cell global identifiers. The list can be arranged, for example, in a pathloss-ascending (or descending or otherwise ordered) fashion or in any order but also tagged with a distance identifier, e.g. path loss value.

The short identifier H(e)NB proposes to use.

Global cell identity of H(e)NB.

H(e)MS receives the request and processes it as descried above in FIG. 4. As a result, a short identifier $SID_K$ is assigned to the access point and H(e)MS sends it to the access point. After receiving the determined short identifier $SID_K$ (step 61) and taking (step 62) it into use, the access node becomes a femtocell.

As described above, the short identifier assignment can be made temporal, i.e. be valid only for duration of a defined validity period. If (step 63) such is applied, $SID_K$ may be applied (step 62) as long as the validity period ha snot been expired. After expiration, a new registration needs to be made.

As discussed above, the identifier control system ICS has been illustrated with a separate entity that operates under the control of the auto-configuration system. The management system H(e)MS has been disclosed here as a logical entity for controlling the access procedure in one network domain. In implementations it is possible that even an operator domain level consistency is difficult to achieve, and therefore operators may need various management systems to manage different proprietary H(e)NB elements from different H(e)NB vendors. In such a case, the embodied ICS may be implemented with a centralized management entity to which local H(e)MS entities are connected. The local H(e)MS may be configured to identify information they need to forward to the centralized management entity, and forward the assigned short identifiers to the relevant requesting access points. The centralized management entity may perform the other steps of the method described in FIG. 4.

FIG. 7 shows a block diagram illustrating an exemplary architecture for an access point/H(e)NB and/or a H(e)MS apparatus, the operations of which have been described in detail above.

The apparatus comprises a processor unit 70 for performing systematic execution of operations upon data. The processor unit 70 is an element that essentially comprises one or more arithmetic logic units, a number of special registers and control circuits. Memory unit 71, data medium where computer-readable data or programs, or user data can be stored, is connected to the processor unit 70. The memory unit 91 typically comprises volatile or non-volatile memory, for example EEPROM, ROM, PROM, RAM, DRAM, SRAM, firmware, programmable logic, etc.

The apparatus also comprises an interface unit 72 with at least one input unit for inputting data to the internal processes of the apparatus and at least one output unit for outputting data from the internal processes of the apparatus. If a line interface is applied, the interface unit typically comprises plug-in units acting as a gateway for information delivered to its external connection points and for information fed to the lines connected to its external connection points. If a radio interface is applied, the interface unit typically comprises a radio transceiver unit, which includes a transmitter and a receiver, and is also electrically connected to a processing unit 70. The transmitter of the radio transceiver unit receives a bitstream from the processing unit 70, and converts it to a radio signal for transmission by the antenna.

Correspondingly, the radio signals received by the antenna are led to the receiver of the radio transceiver unit, which converts the radio signal into a bitstream that is forwarded for further processing to the processing unit 70. Different radio interfaces may be implemented with one radio transceiver unit, or separate radio transceiver units may be provided for the different radio interfaces. The interface unit of the apparatus may also comprise a user interface with a keypad, a touch screen, a microphone, and equals for inputting data and a screen, a touch screen, a loudspeaker, and equals for outputting data.

As disclosed above, H(e)NB typically provides a cellular radio interface for communicating with user equipment in its coverage area and a wired or wireless broadband interface for backhaul connections. H(e)MS is located in the operator premises and is typically connected by a line interface. The processor unit 70, the memory unit 71, and the interface unit 72 are electrically interconnected to perform systematic execution of operations on the received and/or stored data according to the predefined, essentially programmed processes of the apparatus. These operations comprise the procedures which have been described in more detail with FIGS. 1 to 6. In general, various embodiments of the apparatus may be implemented in hardware or special purpose circuits, software, logic or any combination thereof. Some aspects may be implemented in hardware, while some other aspects may be implemented in firmware or software, which may be executed by a controller, microprocessor or other computing device. Software routines, which are also called as program products, are articles of manufacture and can be stored in any apparatus-readable data storage medium and they include program instructions to perform particular tasks. Thus the exemplary embodiments of this invention also provide a computer program product, readable by a computer and encoding instructions for executing a process for delivery of talking party identification information in the apparatus of FIG. 7.

While various aspects of the invention may be illustrated and described as block diagrams, message flow diagrams, flow charts and logic flow diagrams, or using some other pictorial representation, it is well understood that the illustrated units, blocks, apparatus, system elements, procedures and methods may be implemented in, for example, hardware, software, firmware, special purpose circuits or logic, a computing device or some combination thereof. Furthermore, it will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
   operating a mobile communications network where a cell is identifiable by a global identifier unique in the mobile communications network and/or a short identifier re-usable in another cell of the mobile communications network;
   maintaining a registry associating information representing a location within the coverage area of the mobile communications network to a defined group of short identifiers;
   sending from an access point a request for registration to provide services of a cell in a mobile communications network, the request including information indicating a location of the access point;
   using the registry to select a short identifier to be applied in a cell of the access point, wherein the short identifier is selected before registering the access point to provide services of a cell in the mobile communications network; and
   sending a warning message to a macro cell when the macro cell does not operate in a collision-free environment of short identifiers.

2. A method according to claim 1, further comprising:
   storing in a management unit the registry and an algorithm configured to evaluate applicability of a short identifier in that location based on information in the registry; and
   using the registry and the algorithm to determine a short identifier to be applied in the cell of the access point.

3. A method according to claim 1, wherein the access point requests registration to provide services of a femtocell.

4. A method according to claim 1, wherein the information representing a location within the coverage area of the mobile communications network comprises a global identifier of at least one macro cell identified as assessable by the access point.

5. A method according to claim 4, wherein storing in the registry a record comprises the global identifier of one of the at least one macro cell identified as assessable by the access point, the global identifier of the cell of the access point, and the short identifier taken into use in the cell of the access point.

6. A method according to claim 5, wherein storing also temporal information indicates a period during which the short identifier is valid for use in the access point.

7. A method according to claim 4, further comprising:
   assessing macro cells in the access point; and
   selecting macro cells to be identified as assessable by the access point according to a predefined selection procedure.

8. A method according to claim 7, wherein the selection procedure comprises selecting macro cells, the path loss values of which exceed a predefined threshold value, selecting a predefined number of macro cells in the order of their path loss values, or selecting macro cells the deviation of a path loss value from a largest path loss value of which is within a predefined limit.

9. A method according to claim 1, further comprising including, in the request, a proposed short identifier to be applied in the cell of the access point.

10. A method according to claim 9, further comprising:
determining a group of short identifiers in use in cells assessable by the access point; and
using a short identifier that is not in the determined group as a proposed short identifier to be applied in the cell of the access point.

11. A method according to claim 1, further comprising estimating a probability of a conflict or collision between an unused short identifier and the group of short identifiers associated to the location of the access point.

12. A method according to claim 9, further comprising:
determining a probability for conflict or collision between the proposed short identifier to be applied in the cell of the access point and the group of short identifiers associated to the location of the access point; and
determining whether to accept or reject the proposed short identifier to be applied in the cell of the access point according to the determined probability exceeding a predefined threshold.

13. A method according to claim 12, further comprising assigning, in response to rejecting the proposed short identifier, a new short identifier to be applied in the cell of the access point.

14. A method according to claim 11, further comprising:
determining a value representing a probability of conflict between the determined short identifier and the macro cell; and
delivering the value to the macro cell.

15. An apparatus comprising:
means for providing cellular access in a mobile communications network where a cell is identifiable by a global identifier unique in the mobile communications network and/or a short identifier re-usable in another cell of the mobile communications network;
means for sending to a defined management system a request for registration to provide services of a cell in the mobile communications network, the request including information indicating location of the apparatus;
means for receiving an assigned short identifier to be applied in services of the cell, wherein the short identifier is associated with the information indicating location of the apparatus;
means for taking the determined short identifier into use in the apparatus before registration to provide services of a cell in the mobile communications network; and
means for sending a warning message to a macro cell when the macro cell does not operate in a collision-free environment of short identifiers.

16. An apparatus according to claim 15, wherein the request requests registration to provide services of a femtocell.

17. An apparatus according to claim 15, wherein the information representing a location within the coverage area of the mobile communications network comprises a global identifier of at least one macro cell identified as assessable by the access point.

18. An apparatus according to 15, further comprising:
means for assessing surrounding macro cells; and
means for selecting macro cells to be identified as assessable according to a predefined selection procedure.

19. An apparatus according to claim 18, wherein the selection procedure comprises selecting macro cells the path loss values of which exceed a predefined threshold value, selecting a predefined number of macro cells in the order of their path loss values, or selecting macro cells the deviation of a path loss value from a largest path loss value of which is within a predefined limit.

20. An apparatus according to claim 15, further comprising means for including in the request also a proposed short identifier to be applied in the cell of the access point.

21. An apparatus, comprising:
means for managing entry of access point cells to a mobile communications network where a cell is identifiable by a global identifier unique in the mobile communications network and/or a short identifier re-usable in another cell of the mobile communications network;
means for maintaining a registry associating information representing a location within the coverage area of the mobile communications network to a defined group of short identifiers;
means for storing an algorithm configured to evaluate applicability of a short identifier in that location based on information in the registry;
means for receiving from an access point a request for registration to provide services of a cell in a mobile communications network, the request including information indicating a location of the access point;
means for using the algorithm to determine a short identifier to be applied in a cell of the access point, wherein the short identifier is determined before registering the access point to provide services of a cell in the mobile communications network;
means for sending the determined short identifier to the access point; and
means for sending a warning message to a macro cell when the macro cell does not operate in a collision-free environment.

22. An apparatus according to claim 21, wherein the information representing a location within the coverage area of the mobile communications network comprises a global identifier of at least one macro cell identified as assessable by the access point.

23. An apparatus according to claim 22, further comprising means for storing in the registry a record comprising the global identifier of one of the at least one macro cell identified as assessable by the access point, the global identifier of the cell of the access point, and the short identifier taken into use in the cell of the access point.

24. An apparatus according to claim 23, further comprising means for storing also temporal information indicating a period during which the short identifier is valid for use in the access point.

25. An apparatus according to claim 21, wherein the request includes also a proposed short identifier to be applied in the cell of the access point.

26. An apparatus according to claim 25, further comprising:
means for determining a group of short identifiers in use in cells assessable by the access point; and
means for selecting for use a short identifier that is not in the determined group as a proposed short identifier to be applied in the cell of the access point.

27. An apparatus according to claim 21, further comprising means for estimating a probability of conflict or collision between an unused short identifier and the group of short identifiers associated to the location of the access point.

28. An apparatus according to claim 25, further comprising:
means for determining a probability for a conflict or collision between the proposed short identifier to be applied in the cell of the access point and the group of short identifiers associated to the location of the access point; and means for determining whether to accept or reject the proposed short identifier to be applied in the cell of the access point according to the determined probability exceeding a predefined threshold.

29. An apparatus according to claim 28, further comprising means for assigning, in response to rejecting the proposed short identifier, a new short identifier to be applied in the cell of the access point.

30. An apparatus according to claim 27, further comprising:

means for determining a value representing a probability of conflict between the determined short identifier and the macro cell; and means for delivering the value to the macro cell.

31. A mobile communications network, comprising:

an access point including means for providing cellular access in a mobile communications network where a cell is identifiable by a global identifier unique in the mobile communications network and/or a short identifier re-usable in another cell of the mobile communications network, means for sending to a defined management system a request for registration to provide services of a cell in the mobile communications network, the request including information indicating location of the apparatus, means for receiving an assigned short identifier to be applied in services of the cell, and means for taking the determined short identifier into use in the apparatus, the mobile communications network further comprising a macro cell, a management system including means for managing entry of access point cells to a mobile communications network where a cell is identifiable by a global identifier unique in the mobile communications network and/or a short identifier re-usable in another cell of the mobile communications network, means for maintaining a registry associating information representing a location within the coverage area of the mobile communications network to a defined group of short identifiers, means for storing an algorithm configured to evaluate applicability of a short identifier in that location based on information in the registry, means for receiving from an access point a request for registration to provide services of a cell in a mobile communications network, the request including information indicating a location of the access point, means for using the algorithm to determine a short identifier to be applied in a cell of the access point, wherein the short identifier is determined before registering the access point to provide services of a cell in the mobile communications network, and means for sending the determined short identifier to the access point, means for sending a warning message to the macro cell when the macro cell does not operate in a collision-free environment of short identifiers.

32. A mobile communications network according to claim 31, wherein the management system is configured to determine a value representing a probability of conflict between the determined short identifier and the macro cell, and deliver the value to the macro cell, and the macro cell is configured to determine whether to initiate a defined procedure for decreasing the probability of conflict or collision.

33. A mobile communications network according to claim 32, wherein the defined procedure comprises the macro cell requesting user equipment to include global identifier of a measured cell in cell measurement reports.

34. A computer program product comprising program code embodied on a non-transitory computer readable medium, said program code, when run on a processor, causing the processor to perform the method of claim 1.

35. A computer program embodied on a non-transitory computer readable medium, the computer program, when executed by a processor, causing the processor to:

provide cellular access in a mobile communications network where a cell is identifiable by a global identifier unique in the mobile communications network and/or a short identifier re-usable in another cell of the mobile communications network;

send to a defined management system a request for registration to provide services of a cell in the mobile communications network, the request including information indicating location of the apparatus;

receive an assigned short identifier to be applied in services of the cell, wherein the short identifier is associated with the information indicating location of the apparatus;

take the determined short identifier into use in the computer program before registration to provide services of a cell in the mobile communications network; and send a warning message to a macro cell when the macro cell does not operate in a collision-free environment of short identifiers.

36. A computer program product comprising program code embodied on a non-transitory computer readable medium, the program code, when executed by a processor, causing the processor to:

manage entry of access point cells to a mobile communications network where a cell is identifiable by a global identifier unique in the mobile communications network and/or a short identifier re-usable in another cell of the mobile communications network;

maintain a registry associating information representing a location within the coverage area of the mobile communications network to a defined group of short identifiers;

store an algorithm configured to evaluate applicability of a short identifier in that location based on information in the registry;

receive from an access point a request for registration to provide services of a cell in a mobile communications network, the request including information indicating a location of the access point;

use the algorithm to determine a short identifier to be applied in a cell of the access point, wherein the short identifier is determined before registering the access point to provide services of a cell in the mobile communications network;

send the determined short identifier to the access point; and send a warning message to a macro cell when the macro cell does not operate in a collision-free environment of short identifiers.

* * * * *